Nov. 8, 1955     H. S. HALLEWELL ET AL     2,722,787
APPARATUS FOR PRODUCING SHAPED MEMBERS AND/OR
FOR CHECKING THE SHAPE OF MEMBERS
Filed July 6, 1953     6 Sheets-Sheet 1

INVENTORS
HAROLD S. HALLEWELL
CHAS. B. A. PORTER
BY Joseph V. Schofield
ATTORNEY

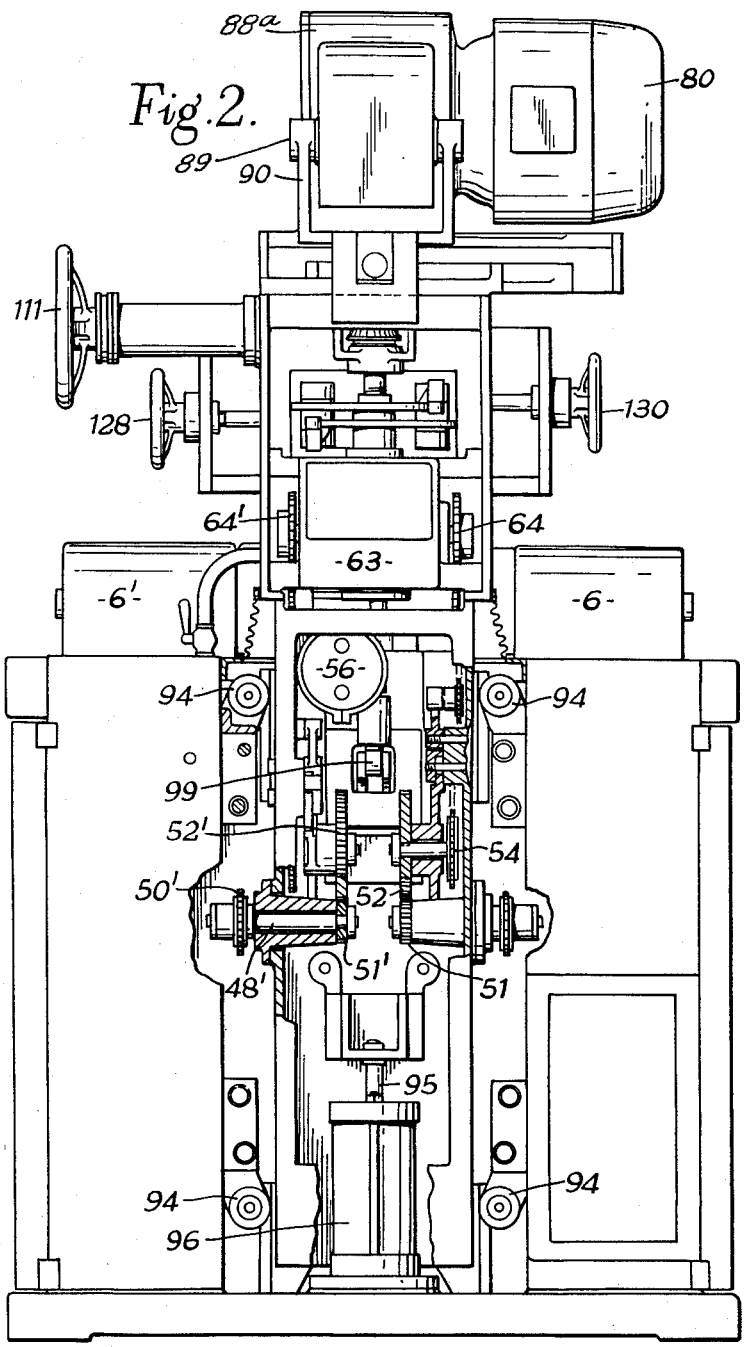

INVENTORS
HAROLD S. HALLEWELL
CHAS. B.A. PORTER

ATTORNEY

United States Patent Office 2,722,787
Patented Nov. 8, 1955

2,722,787

APPARATUS FOR PRODUCING SHAPED MEMBERS AND/OR FOR CHECKING THE SHAPE OF MEMBERS

Harold Stuart Hallewell, Hillingdon Heath, and Charles Benjamin Albert Porter, Yeovil, England Application July 6, 1953, Serial No. 366,309

Claims priority, application Great Britain July 8, 1952

14 Claims. (Cl. 51—142)

This invention relates to shaping and/or shape-checking apparatus and particularly but not exclusively to apparatus for shaping members such for example as rotor, stator, and compressor blades for incorporation in jet engines, and/or apparatus for checking the shape of such members. By "shaping" is meant inter alia turning, milling, grinding or polishing, and also electrical machining methods such as electrolytic, electro-sparking or electro-arcing, and combined electrical and mechanical methods.

The invention is based on the fact that the surface of such members usually comprises a series of straight lines, although the various straight lines of which the surface is composed are not necessarily parallel to one another. The production of such members therefore lends itself to straight-line generation if the work-piece from which the member is to be formed is so moved that the various straight lines to be generated in the work-piece are brought in turn into coincidence with a predetermined fixed straight line. The object of the invention is to provide an improved machine for shaping and/or checking the shape of such members.

The invention will now be described in more detail with reference to a grinding machine, although as will be understood the invention may be employed in conjunction with shaping means other than grinding means.

Figure 1:
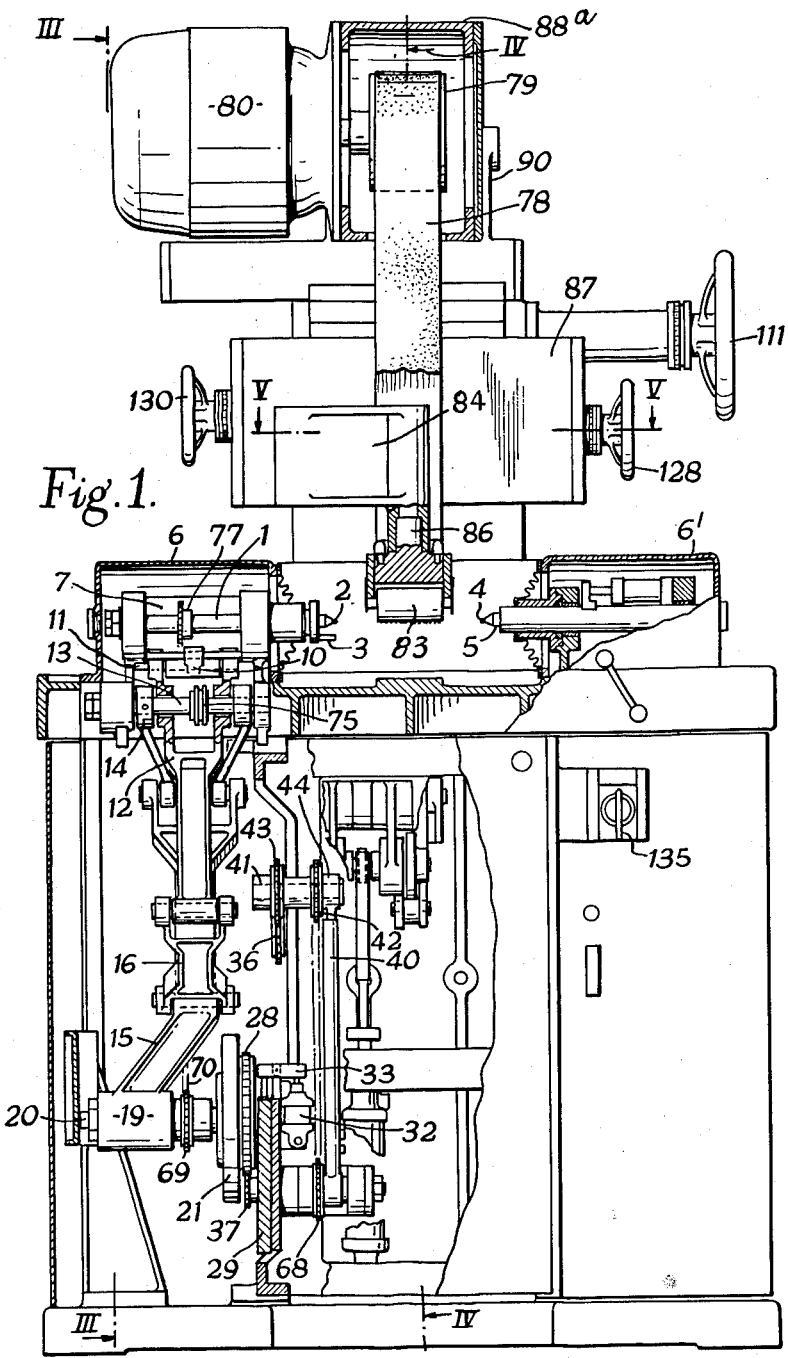
Figure 1A:
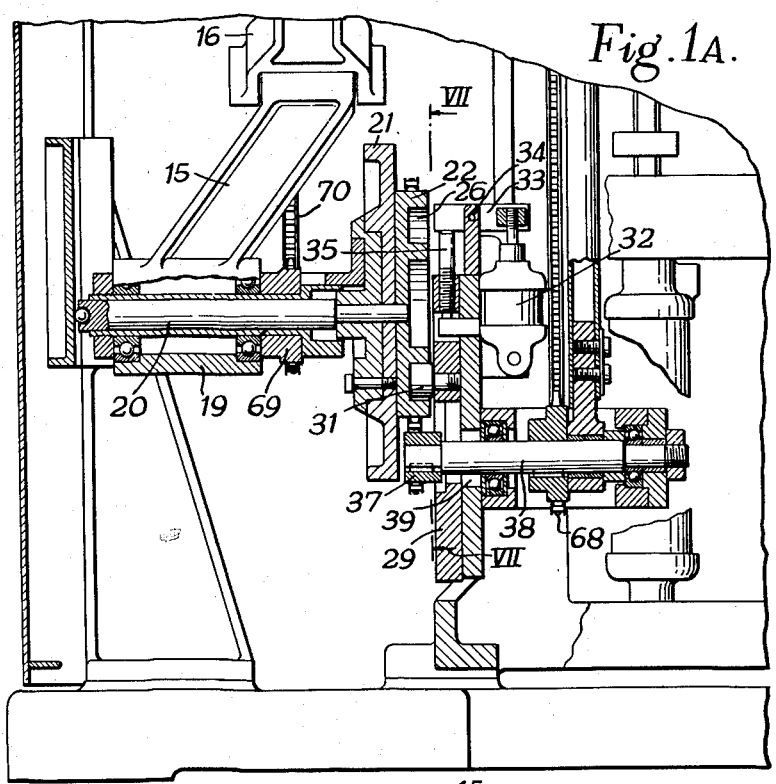
Figure 7:
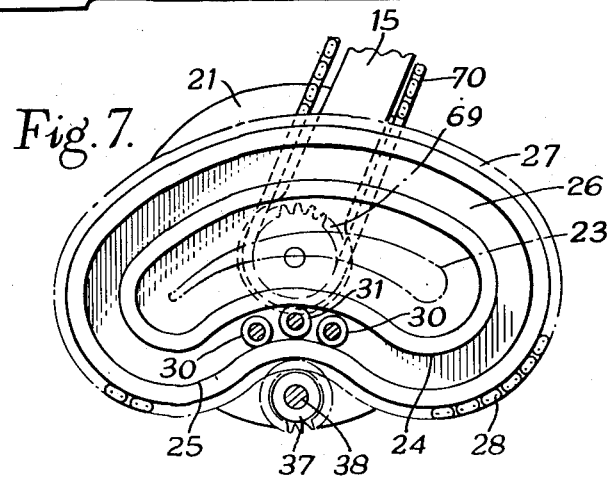
Figure 3:
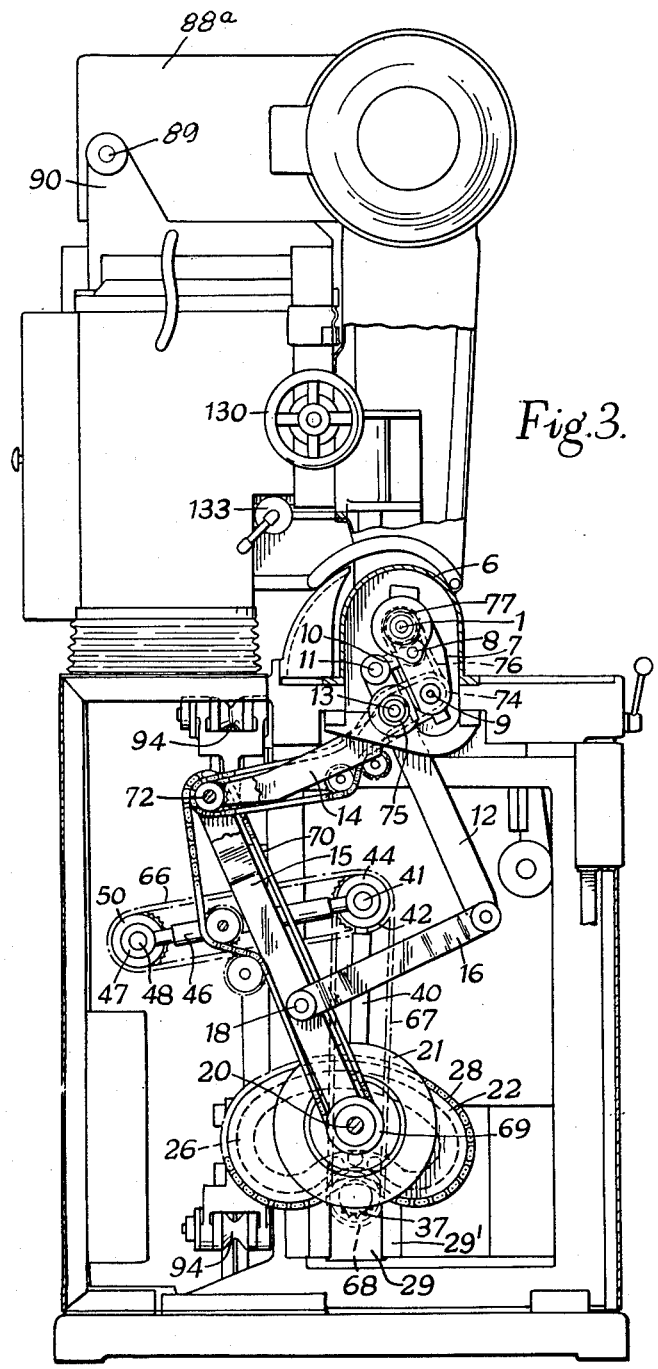
Figure 4:
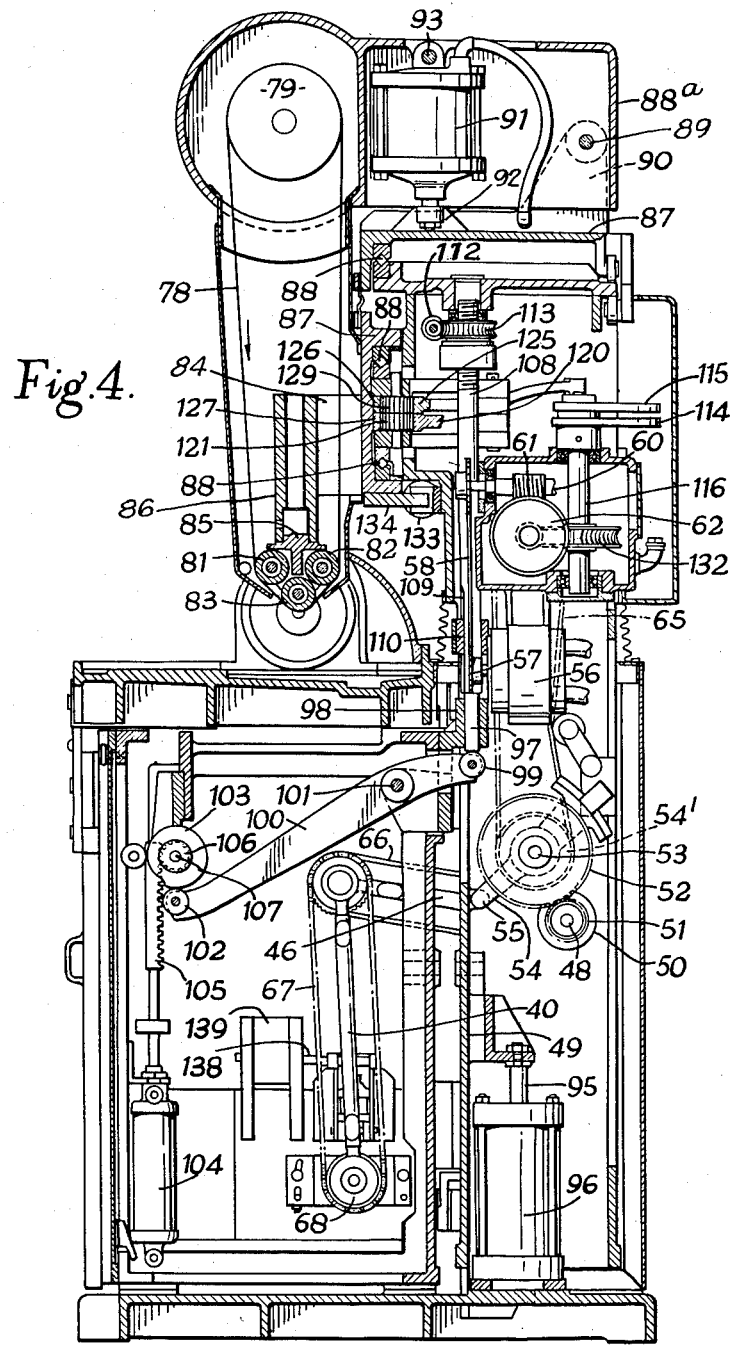
Figure 5:
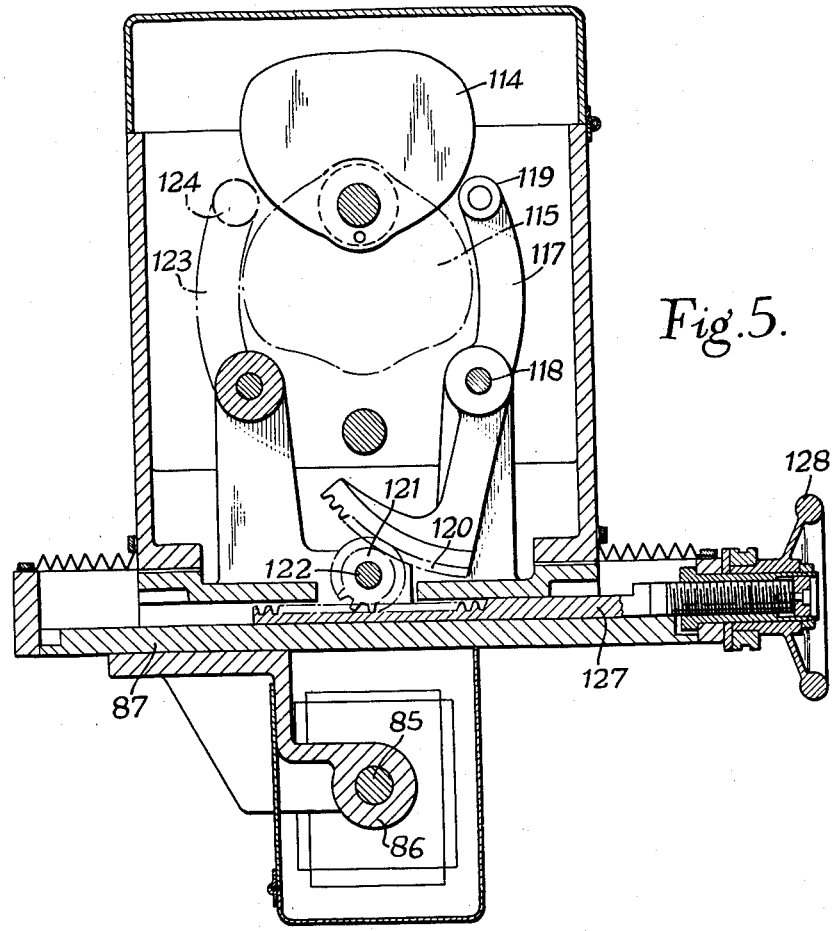
Figure 6:
Figure 6A:

In the accompanying drawings,

Fig. 1 is a front view, partly in section, of a grinding machine according to the invention, with part of the front cover plate broken away, Fig. 1A shows part of Fig. 1 on a larger scale and in greater detail, Fig. 2 is a view of the machine in rear elevation, Fig. 3 is a view on the line III—III of Fig. 1, Fig. 4 is a section on the line IV—IV of Fig. 1, Fig. 5 is a section on the line V—V of Fig. 1, and Fig. 6 is a perspective view of a finished work-piece made by the machine, Fig. 6A is a view looking in the direction of the arrow in Fig. 6, and Fig. 7 is a section on the line VII—VII of Fig. 1A.

Referring to Figs. 1 to 5 of the drawings, the machine illustrated comprises a headstock provided with a spindle 1 which is provided with a ball centre 2 and a driving dog 3 for drivably engaging a recess formed for this purpose in the work-piece, which in the operation of the machine is mounted between the ball centre 2 of the headstock and a ball centre 4 on the tailstock spindle 5. The headstock spindle 1 is disposed within a fixed cover 6 and is rotatably mounted in bearings carried by a bracket 7 provided with an upper pivot shaft 8 and a lower pivot shaft 9 each having its axis parallel to the axis of the spindle 1. The upper pivot shaft 8 is connected by short links 10 to a pivot shaft 11 on the upper end of a forked link 12, in the forked arms of which is mounted a shaft 13 which is rotatably mounted in the frame of the machine. The shaft 13 also projects through the forked arms of a link 14, the ends of the forked arms of which are pivotally connected to the pivot shaft 9. The bracket 7, the short links 10, and the forked ends of the links 12 and 14 form a first parallelogram linkage. The two links 12 and 14 also form two adjacent sides of a second parallelogram linkage which is completed by links 15 and 16 which are parallel respectively to the links 12 and 14, and which are pivotally connected to the links 12 and 14, and also to one another at 18. The link 15 projects downwardly beyond the pivot 18 and carries at its lower end a bearing 19 in which is journalled a shaft 20, which carries a circular face plate 21 to which is secured a cam 22. The two above-mentioned parallelogram linkages together form a pantograph whereby the movements of the axis of the shaft 20 are reproduced by the axis of the spindle 1 in a reduced ratio, which may, for example, be 1:5.

In order to describe the method of forming the cam 22, reference will now be made to Figs. 6, 6A and 7. Figs. 6 and 6A show the shape of a work-piece to be produced by the machine, and it will be assumed that the end A corresponds to the headstock end of the work-piece and the end B to the tailstock end. The cam 22 is employed to determine the profile of the finished work-piece at the end A. In order to form the cam, the shape of this profile is drawn to a suitable enlarged scale, represented by the line 23 in Fig. 7, and around this is drawn a first envelope 24 which is uniformly spaced from the line 23, and around the envelope 24 is drawn a second envelope 25 which is uniformly spaced from the line 23 and likewise from the envelope 24. The cam 22 is then constructed by forming in a piece of suitable material a slot 26 the inner and outer surfaces of which conform respectively to the envelope 24 and 25, the slot 26 therefore being of uniform width. The periphery 27 of the cam 22 is uniformly spaced from the envelope 25, and around it is disposed a roller chain 28 which is fixed to the cam 22 in any convenient manner, for example by means of links which project laterally from the links of the roller chain 28 and are screwed or riveted to the face of the cam 22. The length of the chain 28 should be an exact multiple of the pitch length and to ensure this condition the chain 28 may be fitted to a step provided on the outer surface of the cam, and additionally a packing strip may be provided between the cam 22 and the chain 28. The cam is connected to the face plate 21 by any suitable means which permit of angular adjustment of the cam relatively to the face plate.

A slide 29 which is movable vertically in a guide 29' carries a pair of parallel rollers 30 which project into the slot 26 of cam 22, and a roller 31 carried by a fixed part of the machine also projects into the groove 26. A hydraulic ram 32 engages one end of a lever 33 which is pivoted at 34, and urges the other end of the lever against a pin 35 which bears on the slide 29 so as to urge the slide 29 downwardly, so that the rollers 30 carried by the slide are urged into contact with the outer surface 25 of cam slot 26, and the inner surface 24 of slot 26 is urged into contact with the fixed roller 31. The arrangement of the rollers is such that the centre of the fixed roller 31 is substantially equidistant from the centres of the movable rollers 30 whatever the vertical position of the slide 29 on which the rollers are mounted.

A sprocket 37 is mounted on a shaft 38 which is journalled in a fixed bearing and projects through a slot 39 in slide 29, engages the rollers of the chain 28, so that rotation of the sprocket 37, by means to be described, causes the cam 22 to be drawn between the fixed roller 31 and the movable rollers 30, whereby the axis of shaft 20 describes a path corresponding to the shape of the line 23 (Fig. 7), this path being also described, on a reduced scale, by the axis of the headstock spindle 1, due to the action of the pantograph linkage referred to above.

The driving mechanism for the sprocket 37 comprises an arm 40 which projects from shaft 38 and which carries a shaft 41 on which two sprockets 42 and 43 are mounted. The shaft 41 projects into an eye 44 on arm 40, and into an eye 45 on an arm 46, through an eye 47 of which projects a shaft 48 journalled in bearings fixed with respect to a vertically movable column 49. The shaft 48 carries a sprocket 50 and a gear wheel 51 which meshes with a gear wheel 52 mounted on a shaft 53 carried on an arm 54 which is pivotally connected at 55 to the column 49. The shaft 53 also carries a sprocket 54. A hydraulic driving motor 56 carried by the column 49 has on its shaft a sprocket 57 which is coupled by a driving chain 58 to a sprocket 59 on a shaft 60, which carries a worm 61 which engages with a worm wheel 62, which forms the input element of a gear box 63 which drives sprockets 64 and 64'. A driving chain 65 passes over the sprockets 64 and 54, a driving chain 66 passes over sprockets 50 and 43, and a driving chain 67 passes over sprocket 42 and a sprocket 68 mounted on shaft 38. The sprocket 37 is thus driven by the motor 56.

In addition to the motion of the centre line of the headstock spindle 1 produced by the pantograph linkage, means are provided for rotating the spindle and thereby rotating a workpiece inserted between the ball-centres 2 and 4. The said means comprise a sprocket 69 fixedly mounted on the shaft 20, and a roller chain 70 passing over sprocket 69 and over a sprocket 71 on the pivot shaft 72 which connects links 14 and 15 together, a roller chain 73 passing over a second sprocket (not visible in Fig. 3) on shaft 72 and a sprocket 74 on pivot shaft 9, via a roller 75 on shaft 13, and a roller chain 76 passing over a second sprocket (not visible in Fig. 3) on shaft 9 and a sprocket 77 on spindle 1. Angular movement of the sprocket 69, due to angular movement of the cam 22, is thereby transmitted to the headstock spindle 1.

The tailstock of the machine is disposed within a cover 6' and is provided with a pantograph linkage of which the tailstock spindle 5 forms the follower member, and by which the spindle 5 is caused to move through a path appropriate to the required profile of the work-piece at the end B (Fig. 7) the pantograph mechanism being controlled by a cam derived from the profile of the tailstock end B of the work-piece in the same manner as the cam 22 is derived from the end A. The mechanism as above-described is in fact duplicated on the tailstock side of the machine, except that no means are provided for rotating the tailstock spindle 5, and parts at this side which correspond to parts on the headstock side have been given the same reference numerals with indices. The tailstock spindle 5 may be provided with a spring for resiliently urging it towards the headstock spindle 1 and with quick-release mechanism for facilitating the insertion of work-pieces between the centres 2 and 4 and their removal therefrom.

The grinding means comprises an endless abrasive band 78 which at its upper end passes over a pulley 79 on the shaft of an electric motor 80 and at its lower end passes over three rollers 81, 82, 83 mounted in a bracket 84 on the end of a rod 85 which is fitted into the lower end of a tubular holder 86. The latter is fixed to a carriage 87 which is guided at 88 for lateral movement with respect to the column 46, i. e. longitudinally of the work-piece. The motor 80 is secured to a housing 88a which is pivotally connected at 89 to a bracket 90 on the upper part of the carriage 87, and a hydraulic ram 91 is secured to a flange 92 on the carriage 87. The piston of the ram 91 is pivotally connected at 93 to the carriage 87, so that the latter is urged upwards around the pivot 89 and the band 78 is thereby maintained at the required tension.

Means are provided for moving the column 49 vertically so as to bring the lower end of the abrasive band 78 into and out of contact with the work-piece, and means are also provided for causing the band 78 to move longitudinally of the work-piece while in contact therewith.

The column 49 is guided vertically by rollers 94 and is connected to the piston rod 95 of a hydraulic ram 96 under the control of the operator. The admission of fluid to the ram beneath the piston therein causes the column 49 to rise, thereby lifting the carriage 87 and moving the abrasive band 78 upwards away from the work-piece. When fluid is released from beneath the piston and supplied instead to the upper part of the ram above the piston, the column 49 descends so that the abrasive band 78 moves towards the work-piece. A limit is set to the downward movement of the abrasive band 78 by a stop 97 which is slidable in a fixed guide 98 on the frame of the machine and which is supported at its lower end by a roller 99 on one arm of a lever 100 which is pivotally mounted at 101, the other arm of lever 100 carrying a roller 102 which bears against the underside of a cam 103 which is angularly adjustable under the action of a hydraulic ram 104 via a rack 105 and a pinion 106 mounted on the shaft 107 of cam 103. The stop 97 co-operates with the lower end of a rod 108 carried by the column 49, rod 108 being non-rotatable due to the provision of a key-way 109 in the rod 108 and a key 110 fixed to the column 49. The vertical position of the rod 108 relative to the column 49 is determined by the setting, by the operator, of a control knob 111 which operates a worm 112 which engages an internally screw-threaded worm 113 into which the upper end of the rod 108 is screwed.

The lateral movement of the carriage 87, to effect movement of the abrasive band 78 longitudinally of the workpiece, is effected under the control of cams 114 and 115 which are fixed on a vertical shaft 116 journalled in bearings carried by the column 49. (In Fig. 5 the cam 115 is shown as turned through 180° from its true position, in order to shown its shape.) A lever 117 pivoted at 118 carries at one end a roller 119 which co-operates with cam 114, and at the other end it is provided with a toothed sector 120 which engages with a pinion 121 rotatably mounted on a shaft 122. A lever 123 carries at one end a roller 124 which co-operates with the cam 115 and is provided at the other end with a toothed sector 125 which engages with a pinion 126 also rotatably mounted on the shaft 122. The pinion 121 meshes with a rack 127 which is carried by the carriage 87 and which can be adjusted longitudinally by means of a hand wheel 128 and the pinion 126 meshes with a rack 129, which can be adjusted longitudinally with respect to the carriage 87 by means of a hand wheel 130. The settings of the hand wheels 128 and 130 by the operator determine respectively the movements of the carriage 87 to the right and left respectively, as seen in Fig. 5, from a central position with respect to the column 49 during the rotation of the cams 114 and 115. This rotation of the cams 114 and 115 is effected under the action of a worm on the shaft 131 of worm wheel 62, the worm co-operating with a worm wheel 132 on the shaft 116, the cams thus being driven by the motor 56. The inward movements of the carriage 87 are effected by hydraulic rams. One of these is shown at 133 in Fig. 4. Its piston engages an arm 134 fixed to the carriage and urges the carriage to the right in Fig. 5, following movement of the carriage to the left under the action of the cam 115. Similar means are provided for urging the carriage to the left after it has been moved to the right by the cam 114.

In operation, the ram 96 is operated to raise the column 49, and a work-piece larger in section than is required in the finished member, and provided with a centre in both ends, is mounted between the ball centres 2 and 4, with the driving dog 3 engaging a recess in the end A of the work-piece, and the motors 56 and 80 are set in motion. The abrasive band 78 therefore moves around the pulley 79 and the rollers 81, 82 and 83, and the sprocket 64 drives, via the chain 65, the gear wheels 52 and 51, thereby rotating the sprocket 37 and driving the control cam 22. The control cam associated with the pantograph at the tailstock side of the machine is likewise driven through the medium of the transmission which includes the sprocket 64' and the gear wheels 52' and 41'. The headstock and tailstock spindles are thus caused to move so that their axes follow paths corresponding to the profiles which are required at the respective ends A and B of the work-piece, and at the same time the headstock spindle 1 rotates and causes rotation of the work-piece.

The rotation of the cams 114 and 115 causes the carriage 87 and therefore the abrasive band 78 to execute a reciprocatory movement longitudinally of the work-piece. When the supply of fluid to the ram 96 is suitably controlled by the operator the column 49 descends relatively rapidly, moving the band 78 towards the work-piece, until the rod 108 makes contact with the stop 97. At this time, fluid is supplied to the hydraulic ram 104 whereby the cam 103 is rotated in clockwise direction (Fig. 4), and due to the shape of the cam and the ratio of the arms of the lever 100 the stop 97 is permitted to move downwardly at a very low speed, thereby feeding the band 78 at the same speed towards the work-piece. The speed of the cam 103 is determined by the rate at which fluid is fed to the hydraulic ram 104, this rate being determined initially by the operator suitably setting a control 135 which controls a throttle valve in the circuit (not shown) via which fluid is fed to the ram 104. The work-piece moves so that at any instant a straight line of the surface to be produced is coincident with a fixed straight line, which is coincident with the limit of downward movement of the horizontal line representing the lowermost part of the abrasive band 78. In other words, a fixed horizontal plane is always tangential to the upper side of the surface to be produced in the work-piece. The position of this plane is determined by the setting of the hand wheel 111, which determines the vertical position of the rod 108 relative to the column 49 and therefore the vertical position of the column 49 when the stop 97 is in the lowermost position permitted by the cam 103.

The arrangement is preferably such that the abrasive band 78 traverses the work completely during each revolution of the work-piece. If the member to be produced from the work-piece is required to have end shoulders, as at E, Figs. 6 and 6A, the band 78 may be caused to dwell at or near each shoulder between successive traversing movements, by employing cams 114 and 115 of suitable shape.

When the grinding operation is completed the hyraulic ram 96 is operated to raise the column 49 and thereby lift the abrasive band away from the finished work-piece.

In the machine as so far described the speed of the hydraulic motor 56 is constant, and therefore the peripheral speed of the work-piece past the abrasive band 78 is also constant. Where, however, the profile to be produced exhibits high curvatures, as at the ends of the profiles at A and B of the member shown in Fig. 6, it may be desirable to vary the peripheral speed so that the speed is lower, when a part of the work-piece of relatively high curvature is passing the band 78 than when the part of the work-piece passing the band is of relatively low curvature. For this purpose, the displacements of the slide 29, which are related to the curvature of the part of the slot 26 with which the rollers 30 and 31 are engaged at any time, and hence is related to the curvature of the part of the work-piece presented to the band 78, may be employed for controlling the speed of the motor 56. For this purpose the slide 29 may be provided, as shown, with an arm 138 which operates a control valve 139 which controls the rate at which fluid is fed to the motor 56, the rate of flow being increased and decreased as the curvature of the part of the work-piece passing the abrasive band at the time increases and decreases.

Where, as shown in Fig. 6, the chords C and D of the end profiles of the member to be produced are not parallel to one another, this is taken into account by mounting the control cam 22 in a suitable angular position on the face plate 21, relative to the control cam at the tailstock side of the machine. It will be understood that the profiles at A and B may be similar or of different shapes, the control cams employed at the headstock and tailstock sides of the machine being correspondingly of similar or different shapes. The cam employed at one end may for example have a circular slot; in order to produce a work-piece which at one end is of aerofoil cross-section and at the other end is of circular cross-section.

If desired, instead of using a roller chain as shown at 28, gear teeth may be formed on the cam, sprocket 37 being replaced by a gear wheel meshing with the said gear teeth. An alternative arrangement for driving the control cam is to fix the roller chain, or to provide the gear teeth, on the face plate 21, in which case the driving sprocket or gear wheel as the case may be can then be mounted directly on the link 15.

It will be understood that instead of the roller chains referred to above for transmitting drive from the motor 56 to the sprocket 37, and from the sprocket 69 to the headstock spindle 1, other forms of chain or other driving means may be employed. For example, where high driving torque for the work-piece is required, as for example in turning or milling, the chain drives may be replaced by gearing which incorporates suitable universal drive joints or couplings.

Instead of the two surfaces 23 and 24 being formed by sides of a groove, they may be formed by the sides of a rib on the face of the cam 22, the rollers 30 then being arranged to engage the outer of the two sides and the inner side being arranged to engage the fixed roller 30.

The ratio of each gear wheel 51, 51' to its associated larger gear wheel 52, 52' is inversely proportional to the number of pitches on the associated control cams to the number of teeth on the sprockets which drive the control cams. For example, if the control cam 22 requires a chain 28 having 90 pitches, and the driving sprocket 37 has 30 teeth, then the ratio of the gear wheels 51 and 52 is 1:3.

The abrasive band 78 may be replaced by a grinding wheel. The invention may also be employed in conjunction with means for shaping the work-piece by other methods, for example turning or milling, or in conjunction with means for polishing a shaped work-piece.

The invention may also be employed in conjunction with means for shaping work-pieces by electrical machining methods such as electrolytic, electro-sparking or electro-arcing, or with means which provide combined processes which involve the removal of material from the work-piece both mechanically and electrically (see pages 46 and 57–61 of "Machinery," July 10th, 1952).

Apparatus according to the invention may also be employed for testing the correctness of the surface of a work-piece. For this purpose, in the machine above described the abrasive band and its supporting and driving means may be omitted, and a plurality of dial indicators provided which have movable operating members arranged in line between the centres 2 and 4. There may for example be three such indicators. When the machine is in operation with a member to be tested mounted between the centres, the operating members contact the upper edge of the member. If the surface of the member is accurate none of the dial readings will show any variation during the rotation of the work-piece since the upper edge of the member at any time is coincident with a fixed line. Any inaccuracies are, however, immediately shown by variations in one or more of the dial readings.

If desired, the grinding machine as above described may be provided with indicators which are arranged to move automatically into engagement with the finished member as the abrasive band moves away from the member, so that the accuracy of the member is automatically checked immediately after the grinding of the work-piece. Naturally the indicators will be arranged to move away from their operative positions when the abrasive band moves downwards towards its grinding position.

The plate cams 114 and 115 may obviously be replaced by cams of other types, for instance barrel cams.

It will be understood that the invention is not limited to apparatus incorporating both a headstock and a tailstock. For example the apparatus may comprise a headstock only, the work then being held in a chuck in the headstock instead of between centres as described.

Where both a headstock and a tailstock are employed both may be caused to execute movements under the control of a pantograph mechanism; or where the work-piece is to be shaped with for example an aerofoil profile at one end running into a circular profile at the other end, only the headstock or the tailstock may be arranged to move in a path controlled by a pantograph.

We claim as our invention:

1. A shaping apparatus comprising a headstock for mounting a workpiece to be operated on, a work rotating spindle mounted therein, means for moving said headstock so that the axis of said spindle describes a path in accordance with a profile to be imparted to the workpiece, said means comprising pantograph mechanism of which the said spindle forms the follower link thereof, a tracer member forming the actuating link of said pantograph mechanism, and means constraining said tracer member to follow a path such that the axis of said spindle describes the required path.

2. A shaping apparatus comprising a headstock for mounting a workpiece to be operated on, a work rotating spindle mounted therein, means for moving said headstock so that the axis of said spindle describes a path in accordance with a profile to be imparted to the workpiece, said means comprising pantograph mechanism of which the said spindle forms the follower link thereof, a tracer member forming the actuating link of said pantograph mechanism, means constraining said tracer member to follow a path such that the axis of said spindle describes the required path, and means to rotate the spindle in timed relation to the movements of the headstock.

3. A shaping apparatus comprising a headstock for mounting one end of a workpiece to be operated on, a tailstock for mounting the opposite end of the workpiece, a workpiece supporting and rotating spindle in said headstock, a workpiece supporting spindle in said tailstock, means for moving said headstock so that the axis of said spindle describes a path in accordance with the profile to be imparted to the end of the workpiece adjacent said headstock, means for moving said tailstock so that the axis of the spindle therein describes a path in accordance with the profile to be imparted to the end of the workpiece adjacent said tailstock, said means comprising pantograph mechanisms of which said spindles form the follower links thereof, tracer members forming actuating links of said pantograph mechanisms, and means constraining said tracer members to follow paths such that the axes of said spindles describe the required paths.

4. A shaping apparatus comprising a headstock for mounting one end of a workpiece to be operated on, a tailstock for mounting the opposite end of the workpiece, a workpiece supporting and rotating spindle in said headstock, a workpiece supporting spindle in said tailstock, means for moving said headstock so that the axis of said spindle describes a path in accordance with the profile to be imparted to the end of the workpiece adjacent said headstock, means for moving said tailstock so that the axis of the spindle therein describes a path in accordance with the profile to be imparted to the end of the workpiece adjacent said tailstock, said means comprising pantograph mechanisms of which said spindles form the follower links thereof, tracer members forming actuating links of said pantograph mechanisms, means constraining said tracer members to follow paths such that the axes of said spindles describe the required paths, and means to rotate said headstock spindle in timed relation to the movements of the headstock.

5. Apparatus according to claim 1, wherein said constraining means comprise a control cam pivotally connected to said tracer member and formed with two spaced surfaces, and wherein guide means for said cam are provided, said guide means comprising a pair of movable rollers having spaced parallel axes and a fixed roller having its axis parallel to the axes of said pair of rollers, and said pair of rollers being slidably mounted for movement such that the axis of said fixed roller is substantially equidistant from the axes of said pair of rollers, means for maintaining one of said surfaces in contact with said pair of rollers and the other of said surfaces in contact with said fixed roller, and means for moving the cam so that said surfaces each move past said fixed roller and pair of rollers respectively whilst in contact therewith.

6. Apparatus according to claim 5, wherein said cam is coupled to said spindle by means whereby angular movements of the cam are transmitted to the axis of said spindle.

7. Apparatus according to claim 5, wherein said pair of rollers are carried by a slide which is automatically displaced in accordance with the curvature of said surfaces, a driving motor for effecting movement of said control cam to move said surfaces past said rollers, and means for controlling the speed of said motor in accordance with the position of said slide.

8. Apparatus according to claim 1 comprising shaping means adapted to execute reciprocatory movement longitudinally of the work-piece, and means for independently adjusting the extent of displacement of said shaping means in each direction from a mean position.

9. Apparatus according to claim 8, wherein said means comprise two cams for controlling respectively the displacements in each direction, a reciprocable carriage for said shaping means, two racks extending in the direction of reciprocation of said carriage and independently adjustable with respect thereto, two fixed pinions engaged respectively with said racks, and two levers controlled respectively by said cams and each provided with a toothed sector engaging a respective one of said pinions.

10. Apparatus according to claim 1 including shaping means movable towards and away from the work-piece, a stop for determining the limit of movement of said shaping means towards the work-piece, and means for adjusting the position of said stop.

11. Apparatus according to claim 10, wherein said means comprise an angularly movable cam, means for angularly moving said cam, means for adjusting the rate of angular movement of said cam, and a lever having one arm engaging said cam and another arm serving as an abutment for said stop.

12. Apparatus according to claim 1 including means for varying the peripheral speed of the part of the work-piece in contact with the shaping means, in accordance with the curvature of the required profile of said part.

13. A shaping apparatus comprising a headstock for mounting one end of a workpiece to be operated on, a tailstock for mounting the opposite end of the workpiece, a workpiece supporting spindle in said headstock, a workpiece supporting spindle in said tailstock, means for moving one of said spindle supporting stocks so that the axis of its spindle describes a path in accordance with the profile to be imparted to the end of the workpiece adjacent said movable spindle, said means comprising pantograph mechanism of which said movable spindle supporting stock forms the follower link thereof, a tracer member forming the actuating link of said pantograph mechanism, means constraining said tracer member to follow a path such that the axis of said movable spindle describes the required path, and means to rotate said workpiece in timed relation to the movements of the movable spindle about its path.

14. A shaping apparatus comprising a headstock for mounting one end of a workpiece to be operated on, a tailstock for mounting the opposite end of the workpiece, a workpiece supporting spindle in said headstock, a workpiece supporting spindle in said tailstock, means for moving said tailstock so that the axis of said supporting spindle therein describes a path in accordance with the profile to be imparted to the end of the workpiece adjacent said tailstock, said means comprising pantograph mechanism of which said tailstock forms the follower link thereof, a tracer member forming the actuating link of said pantograph mechanism, means constraining said tracer member to follow a path such that the axis of said tailstock spindle describes the required path, and means to rotate said workpiece in timed relation to the movement of the axis of the tailstock spindle.

References Cited in the file of this patent

UNITED STATES PATENTS

| | | |
|---|---|---|
| 2,171,211 | Day | Aug. 29, 1939 |
| 2,434,834 | Civitarese | Jan. 20, 1948 |
| 2,606,406 | Mueller | Aug. 12, 1952 |

FOREIGN PATENTS

| | | |
|---|---|---|
| 97,881 | Austria | Apr. 15, 1924 |